Nov. 22, 1955  T. E. DUNN  2,724,828
FREQUENCY MODULATED RADAR
Filed June 30, 1951  2 Sheets-Sheet 1
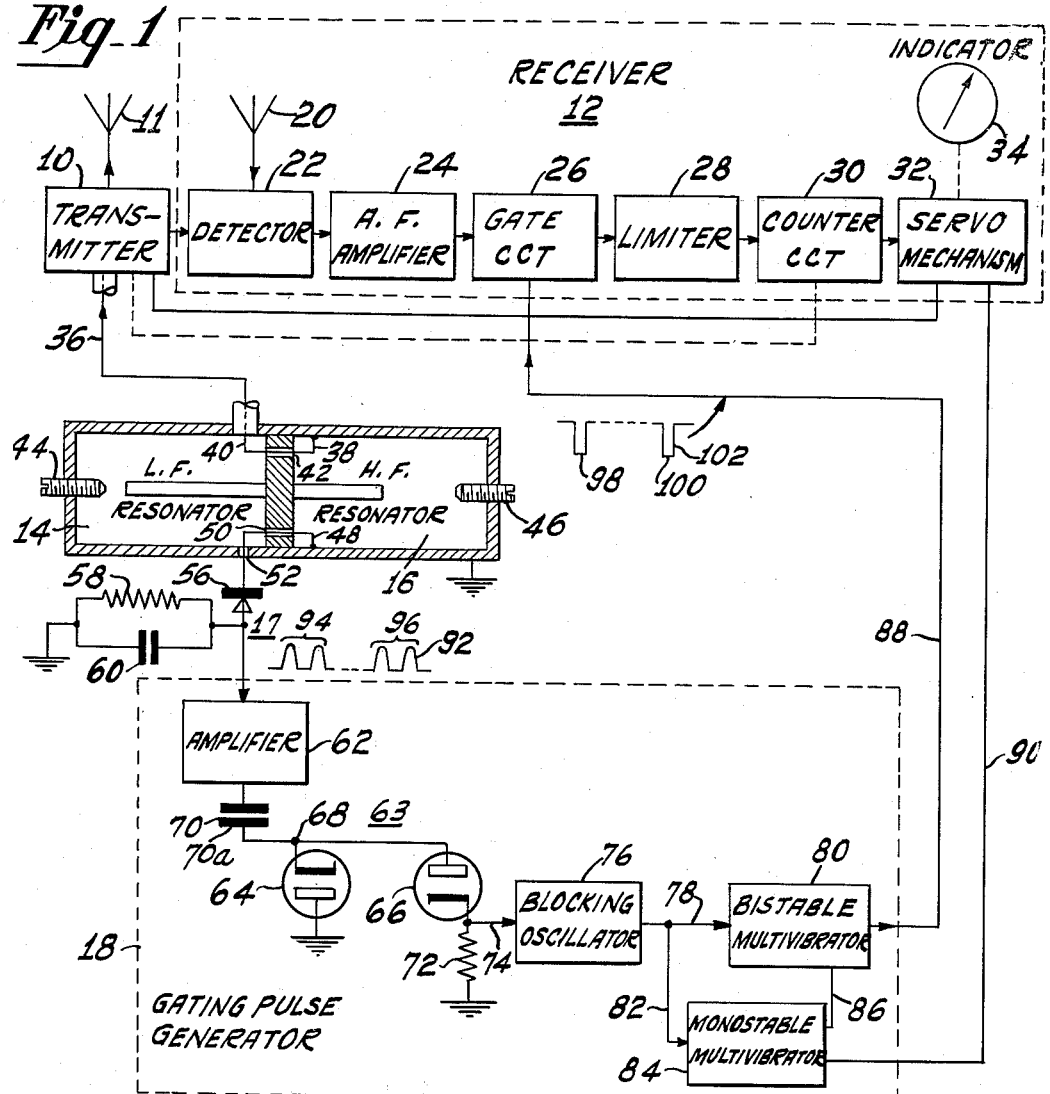
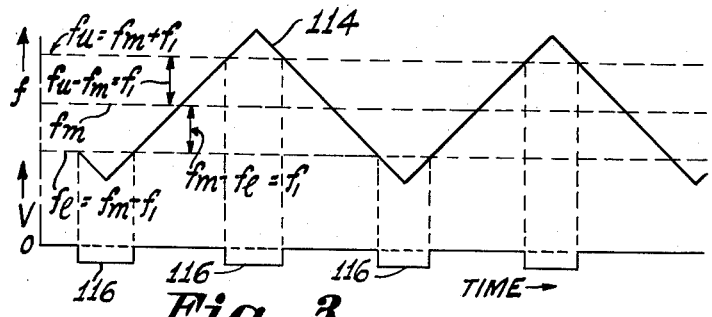
INVENTOR
Ted E. Dunn
BY
ATTORNEY

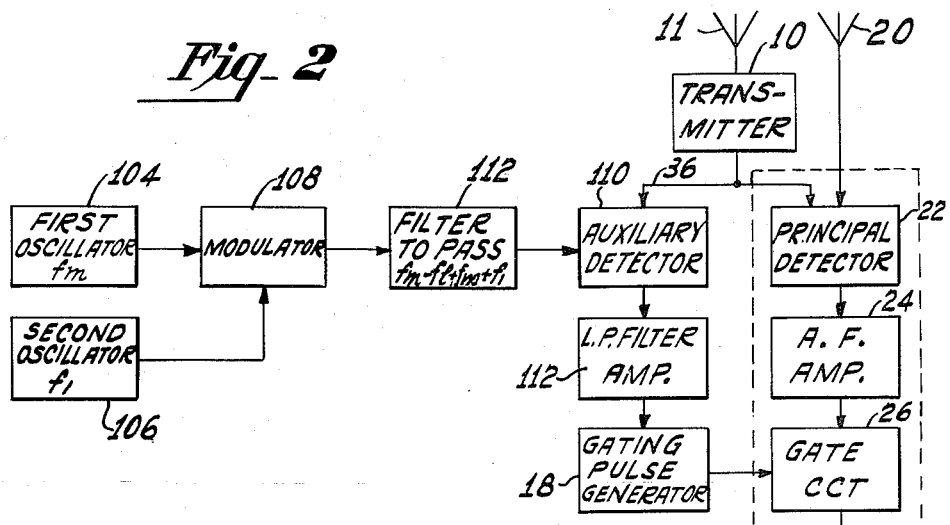
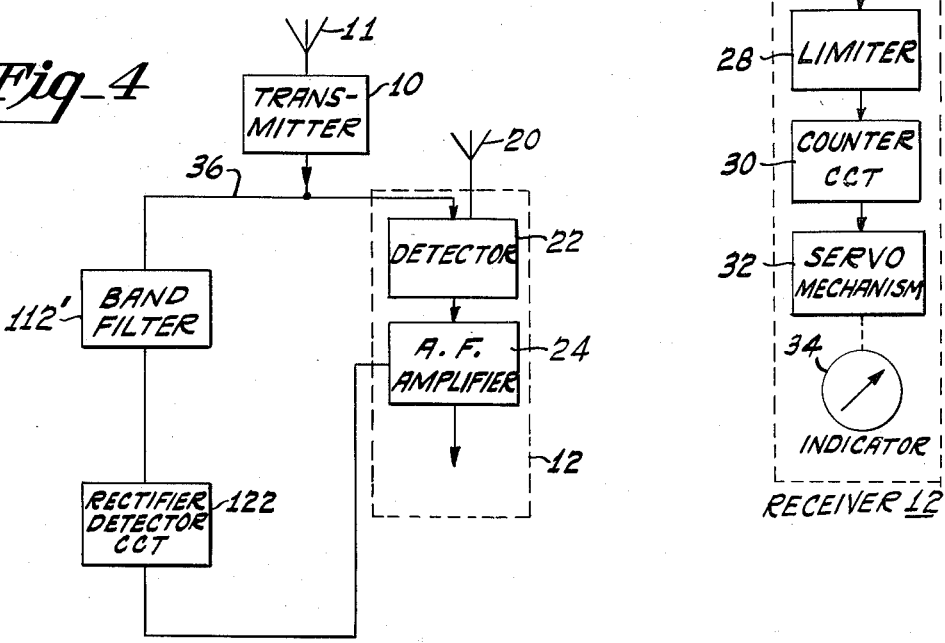

United States Patent Office 2,724,828
Patented Nov. 22, 1955

2,724,828

FREQUENCY MODULATED RADAR

Ted E. Dunn, Pennsauken, N. J., assignor, by mesne assignments, to the United States of America as represented by the Secretary of the Navy Application June 30, 1951, Serial No. 234,603

16 Claims. (Cl. 343—14)

The present invention is related to radar (radio echo detection and ranging) systems, and more particularly to frequency modulated radar systems.

In FM (frequency modulated) radar systems the frequency of the transmitted energy is varied between upper and lower frequency limits repetitively in accordance with some known function of time. The energy of transmission echoed by an echoing body is received in a receiver which detects the frequency shift between the energy then being transmitted and that being received. The function of frequency variation with time being known or controlled, it is possible to determine, as through suitable instruments associated with the receiver, the range to the echoing body. In the usual system, for example, the receiver detects the beat frequency between transmitted and received energy. This beat frequency is a measure of the range. Airplane altimeters are in many instances airborne FM radar systems employing the ground as the echoing body.

It has been considered of importance in FM radar systems to maintain with high stability the frequency limits between which the transmitted energy is varied. This stability, however, is maintained to the desired degree, if at all, only with difficulty, because of the variations in transmitter loading, variations in transmitter oscillator tube capacities, and perhaps other transient factors. As a result of the failure to maintain stability, the receiver range indications are sometimes not as accurate as desirable, because the beat frequency detected is dependent on the difference between the upper and lower limit frequencies. Further, for example, if the transmitted frequency varies as a sinusoidal function of time, in the time intervals near the extremes of the frequency sweep, the variation of frequency with time is slow. The detected beat signals during these time intervals are amplified to a less degree than higher frequencies in the audio frequency amplifiers usually employed. This is especially true as these audio amplifiers are usually designed to give greater gain to higher frequency signals in order to compensate for high altitude reception. As a result, the signal-to-noise ratio is decreased, and the system does not operate with desirable efficiency when the variation of frequency with time is slow or near zero.

It is an object of the present invention to improve the operation of FM radar systems.

It is another object of the present invention to improve FM radar systems.

It is a further object of the invention to control the effective upper, lower, or preferably both upper and lower frequency limits of FM radar systems.

A further object of the invention is to improve the accuracy of FM radar systems by an improved method of operation and by novel apparatus for carrying the method into effect.

Another object is to increase the efficiency of FM radars.

A further object is to improve the accuracy of FM radar systems.

According to the invention, the foregoing and other objects are achieved by disabling the receiver of an FM radar during those periods of time when the transmitter transmits at frequencies above an assigned high frequency, or when the transmitter transmits below an assigned low frequency, or preferably both. In other words, the receiver is gated to pass signal energy only when the transmitter transmits in the frequency range between the assigned frequencies' limits. The effect of disabling the receiver when the transmitter transmits above and below the assigned high and low frequencies, respectively, is the same for the purposes of the invention, as though the transmitter were being swept in frequency from one to the other of the assigned frequencies. However, in fact, the transmitter sweeps in frequency from one to the other of frequency limits respectively lower and higher than the assigned low and high frequencies. Thus the effective frequency limits for the purposes of the receiver and indicator are the assigned frequencies rather than the transmitter limit frequencies. It has been found that the effective limits (the assigned frequencies) may be closely and accurately controlled by various comparatively simple and readily assembled apparatus.

Different apparatus may be employed for practicing the method of the invention. Such apparatus may include high and low frequency resonators coupled to the transmitter and a detector coupled to both resonators for deriving control pulses. These pulses are employed to control the actuation of a gating pulse generator the output from which is used to disable the receiver in the requisite time intervals. The receiver is gated to be operable only during intervals when the transmitter is sweeping between the assigned limit frequencies. Alternatively, a band-pass filter coupled to the transmitter may be employed to derive the requisite control pulses. Another apparatus may include an oscillator having an output of frequency at the mean of the desired upper and lower assigned frequencies. A second oscillator of frequency half the difference between the assigned upper and lower frequencies modulates the output of the mean frequency oscillator to produce sum and difference components between the mean frequency oscillator signal and the second oscillator signal. The frequencies of these sum and difference components are respectively equal to the desired assigned frequencies. These sum and difference components are therefore employed as standards. Through a detector connected to receive both of these components and the transmitter frequencies, control pulses may be derived at the instants of zero beat. These control pulses are used to determine the times of disabling of the receiver, which are the times at which the transmitter frequency sweeps above or below the high and low assigned frequencies respectively.

The foregoing and other objects, advantages, and novel features of the invention will be more apparent from the following description when taken in connection with the accompanying drawing, in which like reference numerals refer to like parts, and in which:

Fig. 1 is a circuit diagram schematically illustrating a preferred embodiment of apparatus for carrying into effect the present invention and employing resonators coupled to the transmitter to derive control pulses for gating and disabling the receiver;

Fig. 2 is a circuit diagram schematically illustrating another embodiment of apparatus for carrying into effect the invention and employing two oscillators from which sum and difference signals are derived to zero beat against the transmitter signal, the zero beat signals providing control voltages for gating and disabling the receiver;

Fig. 3 is a graph useful in understanding the operation of the embodiment of Fig. 2; and Fig. 4 is a variation of the embodiment of Fig. 1, in which a band-pass filter coupled to the transmitters is used to derive the receiver gating and disabling signal.

Referring now more particularly to Fig. 1, an FM radar includes a transmitter 10 with its antenna 11 and with a self-contained frequency modulator (not shown) and a receiver 12. A circuit connected between the transmitter 10 and receiver 12 to derive a gating voltage includes low and high frequency resonators 14, 16, respectively, a rectifier detector 17, and a gating pulse generator 18. The receiver 12 includes, connected to supply signals one to the other in the order named, an antenna 20, a detector 22, an audio frequency amplifier 24, a gate circuit 26, a limiter 28, a counter circuit 30, and a servo mechanism 32. The servo mechanism 32 is mechanically connected to drive an indicator 34.

In the circuit connecting the transmitter 10 and the receiver 12 to gate the receiver, a coaxial line 36 is coupled at one end to transmitter 10 to pick up energy therefrom at the frequency instantaneously being transmitted. At the other end the line 36 terminates in an input coupling loop 38. Input coupling loop 38 enters a wall aperture 40 of low frequency resonator 14 of the coaxial cavity resonator type, passes through an aperture 42 in a wall portion common to both resonators to enter high frequency resonator 16, also of the coaxial resonator type, and terminates with a connection to the wall of the high frequency resonator 16. Each resonator 14, 16 preferably is provided respectively with tuning means, as by tuning screws 44, 46. The coaxial line 36 thus couples both resonators 14, 16 to the transmitter 10.

An output coupling loop 48 enters through wall aperture 52 into the low frequency resonator 14, passes through another common aperture 50 in a common wall portion different from that of the first common aperture 42 to enter high frequency resonator 16, and terminates with a connection to the wall of the high frequency resonator 16. The other end of the coupling loop is directly connecte dto one terminal of a crystal rectifier 56 of the rectifier detector 17. The other terminal of crystal rectifier 56 is connected to one junction of a parallel connected load resistor 58 and by-pass capacitor 60. The other junction of resistor-capacitor combination 58, 60 is connected to a common ground conductor conventionally indicated. Generally throughout the drawing ground connections have been omitted, because unnecessary to an understanding of the circuit diagrams. The resonator walls are also grounded. Thus, the output coupling loop 48 couples both resonators 14, 16 to the rectifier detector 17 which includes the crystal rectifier 56, capacitor 60, and load resitsor 58.

In the gating pulse generator an amplifier 62 is connected to receive the output of the signal detected by the rectifier detector 17 and developed across load resistor 58. These are short pulses in a polarity depending on the crystal connection and the number of stages in amplifier 62. In this instance, the output of amplifier 62 is negative-going pulses from which are derived positive polarity pulses in a novel timing pulse circuit 63 comprising clamping and blocking diodes 64 and 66, respectively, the respective cathode and anode of which are connected at junction 68, capacitor 70 through which the output pulses from amplifier 62 are applied, and a differentiator resistor 72 across which the timing pulse circuit 63 output pulses are developed, as will be explained more fully hereinafter. These output pulses from circuit 63 are applied by a connection 74 to a blocking oscillator 76. Blocking oscillator 76 is of the type which produces a single output pulse in response to each positive-going input pulse applied by connection 74 as to the grid of the blocking oscillator tube.

The output pulses from blocking oscillator 76 are applied by a connection 78 to a bistable multivibrator 80 which has two conditions of stable equilibrium. The output pulses from blocking oscillator 76 are also applied by a connection 82 to a monostable multivibrator 84 which has only one condition of stable equilibrium, from which it is removed to its unstable condition by receipt of one pulse on connection 82 and to which stable condition or state it returns after a recovery time suitably chosen as explained hereinafter. This recovery time may be controlled if desired by a voltage received over a connection 90 from the servo-mechanism 32. Therefore, the monostable multivibrator 84 has one pulse output fo reach pulse applied to it. The monostable multivibrator 84 is connected to bistable multivibrator 80 by a connection 86 and serves as a resetting circuit for the bistable multivibrator 80, as will be explained more completely hereinafter. The output of the bistable multivibrator is a series of gating pulses applied by a connection 88 to the gate circuit 26 of the receiver 12.

In operation of the system of Fig. 1, the transmitter may sweep in frequency in accordance with some known function of time, as a symmetrical sawtooth, in which case the frequency increases at a uniform rate to some upper limit, then decreases at the same rate to some lower limit, and then repeatedly sweeps through the cycle. The sweep frequency rate or modulation rate may be of the order of 8 to 80 cycles per second, and is usually many times less than the radio frequency of transmission. The energy of transmission is radiated by transmitter antenna 11 and echo energy picked up by receiver antenna 20. The energy received at the antenna 20 is beat against the energy instantaneously being generated or transmitted. The beat or difference frequency between the two energies derived from detector 22 is often called the audio frequency by analogy to broadcast receiver techniques, although it may not actually lie in the audio frequency range. This beat frequency is amplified in an amplifier 24 customarily called an audio amplifier. The gate circuit 26 indicated by a separate block in Fig. 1 may be only a single amplifier stage, preferably employing a type of tube readily cut off during receipt of negative-going rectangular pulses from the gating pulse generator 18. The limiter 28 removes any amplitude modulation which may result in false indications. The counter circuit 30 may be of the type which derives a voltage proportional to the number of cycles of the applied audio frequency which directly actuates an indicator, or, as preferred and illustrated, of the type which actuates a servo mechanism 32 in response to the indicator count. The servo mechanism 32 is mechanically connected to drive an indicator 34. Except for the gate circuit 26, the apparatus thus far described may be the same as that disclosed in my copending application, Serial No. 190,771, filed October 18, 1950, now U. S. Patent 2,695,996 granted November 30, 1954, entitled "Frequency Modulated Radar," and operates in the same manner. The mechanical and electrical connection between the transmitter 10 and the receiver 12 may serve the purposes of the like connections in the arrangement illustrated in Fig. 2 of the said copending application. The mechanical connection may serve to operate a switch in the counter 30 to make indications of indicator 34 substantially independent of the modulating rate. The electrical connection from the servo-mechanism 32 to the transmitter 10 may serve to control the modulating rate (sweep frequency) of a modulating means in transmitter 10 responsive to the applied voltage. The intermediary of an auxiliary speed servo amplifier and associated circuits may be required as fully disclosed in my said copending application. However, the speed servo amplifier and associated circuits are not further illustrated or discussed in detail herein because it is believed unnecessary to a full understanding of the present invention, and may be assumed as part of the transmitter 10 or part of the servo mechanism 32.

The transmitter is arranged to sweep in frequency at a modulating rate which may be controlled as mentioned above, from a low limit frequency to a high limit frequency. The resonators 14, 16 are respectively tuned to assigned frequencies above and below the low and high limit frequencies. Assuming that the transmitter frequency starts at the low limit and increases, it reaches the frequency of low frequency resonator 14 to which it is coupled by the common input coupling loop 40. The low frequency resonator is thus excited to resonance, some of the energy being coupled out of the low frequency resonator by the common output coupling loop 50. This energy at the resonant frequency coupled to rectifier detector circuit 17 therefore causes a pulse of voltage to appear across the resistor-capacitor combination 58, 60. The direct current circuit for the rectifier detector includes the resonator wall which is grounded for direct current. At a later time, the common input coupling loop 40 excites high frequency resonator 16, which at resonance, couples energy to the common output coupling loop 48. The output coupling loop thus again feeds energy to rectifier detector circuit 17, and causes another pulse of output energy. The frequency is now swept lower and passes again the resonance point of the high frequency resonator 16. Again a pulse of output energy is developed by rectifier detector 17. With further decrease in frequency, the low frequency resonator 14 is again excited at resonance and again a pulse is produced by rectifier detector 17. With the assumed frequency sweep of a symmetrical sawtooth character, and assuming the assigned resonance frequencies of the low and high frequency resonators 14, 16 to be respectively quite close to the low and high frequency limits swept by the transmitter, a pair of pulses arising from the low frequency resonator 14 are closely spaced in time compared to the time between this pair and the next closely spaced pair arising from the high frequency resonator 16, and then another space, et cetera. A cycle of the voltage form of the output from rectifier detector 17 is roughly illustrated in idealized form by the water form 92 in which a pair of closely spaced pulses 94 may be those arising from resonance of the low frequency resonator 14, and a second closely spaced pair 96 may arise from the resonance of the high frequency resonator 16. A substantially longer time interval exists between the pair of pulses 94 and the pair 96 than between the pulses of a single pair, as indicated by the dotted line portion of the wave form 92. This spacing is a result of the assumed sweep frequency. Variations, if any are required, with other frequency sweeps, are in most cases only with respect to the timing constants of the multivibrator circuits, and in any event, will be apparent form what is said herein to those skilled in the FM radar art. The sharpness of the pulses depends in general on the rapidity of the sweep, the Q of the resonators, and the characteristics of the rectifier detector. The signal output from rectifier detector 17 is applied to the gating pulse generator 18.

The amplifier 62 of the gating pulse generator 18 amplifies and inverts the signal from rectifier detector 60 and feeds the amplifier pulses to the novel circuit 63. The capacitor 70, a rectifying element (diode 66) and the resistor 72 are serially connected. The signal from amplifier 62 is impressed across the serially connected elements. The anode of the diode 66 is connected to the capacitor because the amplified pulses impressed are negative-going. The capacitor 70 and the resistor 72 preferably have the relative values of those in a conventional differentiating circuit and the output is taken across some part of the resistor 72. A conventional differentiating circuit would produce from each amplified and inverted input pulse of wave form 92 both a negative-going and positive-going output pulse corresponding respectively to the leading and lagging edge of each pulse of wave form 92. However, with the circuit here disclosed, the diode 64 connected at the junction 68 permits the capacitor to charge with electron flow through diode 64 away from the capacitor plate 70a connected to junction 68. This charge is not indefinitely retained, but starts to be neutralized by electron current flow through diode 66 initiated substantially at the peak of the negative pulse impressed on the pulse timing circuit 63. This last-mentioned flow causes a positive-going output pulse across resistor 72 which, at least to a close approximation, has its leading edge intiated at the moment the voltage impressed on pulse timing circuit 63 is maximum negative amplitude. This moment, however, is substantially the same as that at which resonator 14 or 16 (from which the pulse arose) is at maximum excitation; which moment, in turn, is the one at which the transmitter is transmitting at the assigned frequency of resonance of the excited resonator 14 or 16. Because the time of initiation of each output pulse from novel circuit 63 with a high degree of exactness occurs at the time the transmitter 10 transmits at one or the other of the assigned frequencies, this circuit is preferred. However, the pulse-timing circuit 63 could be dispensed with entirely, if desired. Another alternative for circuit 63 would be a pulse timing circuit for a negative input pulse, which would include the circuit 63 as shown, except that a capacitor (not shown) is connected between the diode 64 cathode and ground, across which capacitor the output is taken, rather than across the resistor 72. Both the pulse timing circuit 63 and the last modification suggested are disclosed, claimed, and more completely described and explained in my copending application entitled "Pulse Circuit," Serial No. 234,604, and filed concurrently herewith, now abandoned.

For the blocking oscillator 76 a suitable circuit may be chosen from those discussed in chapter 6, volume 19, Wave Forms, edited by Britton Chance et al., Radiation Laboratory Series, starting at page 205, published by the Massachusetts Institute of Technology. A "triggered" blocking oscillator or monostable circuit, producing a single output pulse for each input pulse applied is the type here desired. See, for example, the circuit illustrated in Fig. 6.8. $R_g$ and $C_g$ would be adjusted so that the blocking oscillator would fire only once for each input pulse. Other circuits than blocking oscillators are known for performing the desired function. The pulse output from blocking oscillator 76 is applied both to the bistable multivibrator 80 and the monostable multivibrator 84 by connections 78 and 82, respectively. Each pair of pulses applied to bistable multivibrator 80 and derived from pairs of pulses such as 94 or 96 is to produce gating pulses 98 or 100, respectively on connection 88 as indicated by the idealized wave form 102. The first of a pair of pulses applied to bistable multivibrator 80 finds it in one condition of stable equilibrium and impels it to the other condition of stable equilibrium. The second pulse of each pair applied to the bistable multivibrator 80 returns it to its initial condition of stable equilibrium. The first of a pair of pulses applied to the monostable multivibrator 84 finds it in its single stable condition and causes it to depart therefrom to an unstable condition in which, however, it remains for a time chosen to be longer than the longest interval expected between a pair of applied pulses. The single positive output pulse from monostable multivibrator 84 is differentiated and applied to the bistable multivibrator 80 to one of the grids of the bistable multibivrator. This grid is the one of the section which is desirably nonconductive in the initial state of the bistable multivibrator 80. The differentiated leading edge of the pulse (positive polarity) from monostable multivibrator 84 causes no change in the condition of bistable multivibrator 80 as it finds this one section conductive. The one section is in this state because this differentiated leading edge is later in time or substantially coincident with (in which case it aids) the first of a pair of pulses applied from connection 78 to the bistable multivibrator 80. The differentiated trailing edge (negative polarity), however, is sufficient to return the bistable multivibrator 80 to the desired initial condition if it is not already in that condition.

Alternatively, a diode (not shown) could be inserted in the output from the monostable multivibrator 84 and connected to suppress the positive impulses arising from the leading edge of the monstable multivibrator 84 output. Thus in any event only the negative impulse arising from the trailing edge of the monostable multivibrator 84 output need be applied operatively to the bistable multivibrator 80. The monostable multivibrator 84 is thus a resetting circuit for the bistable multivibrator 80 assuring that the first of each pair of incoming pulses, after the first cycle or so, from blocking oscillator 76 finds the bistable multivibrator 80 in the desired state of stable equilibrium, so that the output from the bistable multivibrator 80 is in the desired polarity.

Monostable and bistable multivibrators are fully disclosed and discussed, for example, in chapter 5 of Wave Forms, volume 19 of the Radiation Laboratory Series, as well as in other publications. For example, suitable circuits for a bistable multivibrator might be the one illustrated in Fig. 5.4 at page 164 of the cited volume. A suitable circuit for the monostable multivibrator might be the one illustrated in Fig. 5.12 of the same volume. From the discussion of the circuit of Fig. 5.12 at page 169 and from what is disclosed herein, it is readily understood that a potentiometer controlling the grid voltage of one of the tubes (corresponding to the potentiometer shown in Fig. 5.12) may have an arm driven by the servo mechanism 32 and the voltage therefrom supplied over connection 90 to control the duration of the unstable state of monostable multivibrator 84, as hereinafter suggested. The duration of the unstable state is preferably so controlled to assure that the resetting time falls between pairs of pulses, such as 94 and 96, where the separation in time between them is variable due to variations in the controlled frequency modulation rate. Other circuits are known which could readily perform the functions of the multivibrator circuits.

The gate circuit 26 to which the negative-going blanking pulses such as 98, 100 are applied, may be a single stage amplifier with a sharp cutoff tube biased so that pulses 98, 100 are of sufficient amplitude to cut off the tube of stage 26 during the pulse period of pulses 98, 100. The receiver is thus disabled during the pulse periods. The stage 26 may be part of the audio frequency amplifier 24, being separately illustrated for convenience in description and ready reading of the drawing. Certain detectors, which might be detector 22, are also known which can be disabled by such pulses of voltage as pulses 98, 100. Alternatively, the limiter 28 or counter 30 might be disabled, by the pulses such as 98, 100, but with rather practical difficulties. At the present time it is deemed more practical and desirable to have a separate gate circuit 26 as illustrated or one in the audio amplifier 24 to perform the desired function of disabling the receiver 12 in response to the pulses 98, 100. It is, however, desirable to gate near the output of the A. F. amplifier, as this tends to prevent the erroneous counting of receiver noise or microphonics during the blanked time interval. Gating of the counter circuit, as has been done for other purposes, would be suitable and perhaps desirable in view of this consideration.

It is clear from the foregoing description: (1) that the leading edge of pulse 98 corresponds in time or occurs at the time of transmission by the transmitter 10 of a signal having a frequency equal to the resonant frequency of low frequency resonator 16 during the descending or frequency decreasing sweep period of the transmitter 10; (2) that the lagging edge of pulse 98 corresponds in time to transmission of a signal equal in frequency to the resonant frequency of the low frequency resonator 14 during the frequency increasing sweep period of the transmitter 10; (3) that the leading edge of pulse 100 corresponds in time to transmission of a signal equal in frequency to the resonant frequency of the high frequency resonator 16 during the frequency increasing sweep period of the transmitter 10; and (4) that the lagging edge of pulse 100 corresponds in time to transmission of a signal equal in frequency to the resonant frequency of the high frequency resonator 16 during the frequency decreasing sweep period of the transmitter 10. The receiver 12 is disabled during the duration of pulse 98 or 100. Thus, the receiver 12 is disabled during periods of time when the transmitter 10 transmits at frequencies below or above the low or high frequencies, respectively assigned as the resonant frequencies of the resonators 14, 16.

The time correspondence between transmission at the resonant frequencies of the low and high frequency resonators 14, 16 and the edges of pulses 98, 100, respectively, may not be exact because of various phase shifts within the apparatus and may depend to some extent upon the rapidity of the frequency sweep of the transmitter 10. However, the correspondence may be made exceedingly close by good design, and may be taken as substantial. It also should be recognized that the assigned frequencies below or above which the receiver 12 is disabled is not necessarily precisely at the resonant frequency of the resonators 14, 16, the important factor being that these assigned frequencies be consistent and stable in operation.

The connection 90 from the servo mechanism to monostable multivibrator 80 is a direct current connection which controls the recovery time of the monostable multivibrator 84 to its stable condition after it has been impelled to leave its stable state by a signal or pulse on connection 82. This voltage 90 is introduced to the monostable multivibrator 84 to assure that its natural period will terminate in the time between pulses such as 98 or 100 because the transmitter modulation rate may vary with altitude in the particular device here disclosed as explained in my said copending application, for example, from 8 to 80 cycles per second. The period in which the monostable multivibrator 84 remains in its unstable state may be readily controlled by the same D. C. voltage on connection 82 which controls the modulating rate of the transmitter 10. If desired, of course, a separate voltage may be secured by a potentiometer designed for the purpose and having a pickup arm mechanically attached to the servo mechanism as suggested hereinbefore.

The assigned low and high frequencies during the times below and above transmission of which respectively the receiver is disabled may be stabilized to a greater degree than the limit frequencies of transmitter 10, or at least with less difficulty for a like degree of stability. However, so far as the receiver 12 is concerned, with the receiver gated as described, the effective limits of the transmitter for detection and counting purposes are the assigned frequencies and not the limit frequencies of the transmitter 10. Therefore, the stability of the FM radar, its signal-to-noise ratio and the reliability of its indications are all improved with the stability of the assigned frequencies. Precision of the transmitter limit frequencies is no longer necessary.

Referring now more particularly to Fig. 2, the transmitter 10 and receiver 12 may be the same as those of Fig. 1. A first oscillator 104 generates signals of frequency $f_m$ and a second oscillator 106 generates signals of frequency $f_1$. The signals from the second oscillator 106 modulate those from the first oscillator 104 in a modulator 108. The modulator 108 may be of the balanced modulator type which suppresses the carrier frequency $f_m$. The signals of the upper and lower side band frequencies $f_m - f_1$ and $f_m + f_1$ are supplied to an auxiliary detector 110 if desired through a filter 112 designed to further suppress the carrier frequency. The auxiliary detector is also connected to receive energy from the transmitter 10 through a connection such as 36. The output from the auxiliary detector 110 is supplied to a low pass filter and amplifier 112, the output from which is supplied to a gating pulse generator 18 which may be the same as or similar to the gating pulse generator 18 of Fig. 1.

In operation, the frequency $f_m$ of the first oscillator 104 is selected at the mean value of the desired assigned frequencies. The frequency $f_1$ of the second oscillator 106 is selected to be one half of the difference between desired assigned upper and lower frequencies which may be designated for convenience $f_u$ and $f_l$, respectively. It follows then that the side band frequency $f_m - f_1$ and $f_m + f_1$ are respectively the lower and upper assigned frequencies $f_l$ and $f_u$. The low pass filter and amplifier 112 passes a signal only during the moments when the transmitter 10 is substantially at zero beat with respect to one or the other of side band frequencies $f_l$ and $f_u$. The gating pulse generator 18 then operates substantially as before to supply a gating or disabling voltage to the gating circuit 26, the receiver 12 being gated to pass voltages during the intervals when it is not disabled, and being disabled during the other intervals of time. The relationships of the frequencies of the first and second oscillators 104, 106 and the assigned lower and upper frequencies $f_l$ and $f_u$, respectively, will be clear by reference to Fig. 3. In Fig. 3, curve 114 represents a portion of the transmitter frequency plotted against time and the dotted lines as labeled respectively from top to bottom indicating $f_u$, $f_m$, and $f_l$. The resultant disabling voltages which may be derived from the gating pulse generator 18 are indicated in idealized form on the same time axis by the rectangular pulses 116. In order to secure high stability of the upper and lower assigned frequencies, the oscillators 104 and 106 may be crystal controlled or any one of several well-known highly stable types of oscillators.

Referring now more particularly to Fig. 4, the FM radar system may include the same transmitter 10 and receiver 12. By a connection such as 36 a voltage at the instantaneous frequency of transmission may be supplied to a band-pass filter 112' designed to pass preferably with sharp cutoff the band of frequencies from $f_l$ to $f_u$. The band-pass filter 112' may be connected to a rectifier detector circuit 122 which may employ a crystal diode rectifier. The rectifier detector circuit 122 may produce a single output pulse of positive polarity as the transmitter frequency sweeps between the frequencies $f_l$ and $f_u$. These output pulses may be squared and used as gating pulses applied to A. F. amplifier 24. Alternatively, the band filter 112' may be a rejection filter, and then the output pulses may be used as blanking pulses, the receiver thereby being gated to operate as the transmitter sweeps through the rejection band.

Gating of receiver 12 can be accomplished in any one of several ways. For example, by using a pentode for the last audio frequency amplifier stage or in the limiter and applying a disabling voltage to the pentode suppressor; or by using a triode for one of the diodes in the counter and applying the disabling voltage to the triode grid together with a suitable D. C. bias.

The novel apparatus for carrying the invention into effect and particularly the apparatus of Fig. 1 is preferred as it affords a high degree of stability of the upper and lower assigned frequencies and affords a means of improving the effective stability of transmitter bandwidth and the accuracy of altitude indication, at standard operational frequencies now used in practical apparatus. Although the receiver can be disabled only when the transmitter transmits below the assigned low frequency, or only when the transmitter transmits above the assigned high frequency, it is preferable to disable the receiver under both conditions, as effectuating a greater stability of operation and a greater improvement than for one or the other condition alone.

What is claimed is:

1. A frequency modulated radio echo detection and ranging system comprising a transmitter frequency modulated over a range of frequencies between lower and upper limits respectively less than and greater than two assigned frequencies $f_l$ and $f_u$, $f_l$ being less than $f_u$, a receiver to receive echoes of the transmitted energy, and a circuit coupled between said transmitter and said receiver to disable said receiver during periods of transmission of energy of frequency less than $f_l$ and greater than $f_u$, said circuit comprising means for producing a pulse each time that the frequency of the modulated wave passes through said frequency limits whereby there is produced a pair of pulses as it passes through the lower frequency limit and a pair of pulses as it passes through the upper frequency limit, means for producing successive gate pulses each of which is initiated by the first pulse of one of said pairs of pulses and is terminated by the second pulse of said one pair of pulses, and means for applying said gate pulses to said receiver to disable it during the occurrence of each gate pulse.

2. The system claimed in claim 1, said circuit comprising a pair of resonant circuits coupled to said transmitter to receive energy therefrom, and tuned respectively substantially to said frequencies $f_l$ and $f_u$.

3. The system claimed in claim 1, said circuit comprising a pair of resonant circuits coupled to said transmitter and tuned respectively substantially to said frequencies $f_l$ and $f_u$, said circuit also comprising a single rectifier circuit coupled to both said resonant circuits to receive voltages applied therefrom.

4. The system claimed in claim 1, said circuit comprising a pair of resonators, each connected to said transmitter to receive exciting energy from said transmitter, and a single detector circuit coupled to both resonators.

5. The system claimed in claim 4, said resonators being separately tunable.

6. The system claimed in claim 1, said circuit comprising an oscillator generating energy at the mean frequency between said assigned frequencies, and a second oscillator generating energy at half the difference frequency between said assigned frequencies.

7. The system claimed in claim 6, said circuit further comprising a modulator to amplitude modulate said mean frequency energy with said difference frequency energy.

8. The system claimed in claim 6, further comprising a detector connected to receive energy of the sum and difference frequencies of the modulated energy, and to receive energy from said transmitter, and a low pass filter connected to said detector, whereby said filter passes pulses at the zero beats of said transmitter energy with said sum and difference frequency energy.

9. The system claimed in claim 1, said circuit comprising a detector circuit connected to said transmitter to produce voltage pulses substantially at each instant of time said transmitter sweeps through said assigned frequencies and a bistable multivibrator connected to receive said pulses and having an output of alternately gating and disabling voltage, said receiver being connected to said circuit including a connection to receive said gating and disabling voltage to disable said receiver during said periods.

10. The system claimed in claim 9, said circuit further comprising a monostable multivibrator connected to receive said voltage pulses and further connected to reset said bistable multivibrator.

11. The system claimed in claim 1, said circuit comprising a pair of low and high frequency resonators having a common coupling with said transmitter, a rectifier detector having a common coupling with said resonators, a pulse sharpening circuit coupled to receive the output of said rectifier detector, a blocking oscillator coupled to receive the output of said pulse sharpening circuit and having a single pulse output for each pulse input, a bistable multivibrator coupled to be actuated from one of its two stable states to the other stable state by said blocking oscillator pulse output, a monostable multivibrator coupled to receive the output of said blocking oscillator and coupled to apply the monostable multivibrator output to said bistable multivibrator as a resetting circuit, said bistable multivibrator being coupled to said receiver to apply thereto a gating and disabling voltage.

12. The system claimed in claim 11, said receiver comprising a servo mechanism, said transmitter being coupled to said servo mechanism to receive a sweep frequency controlling voltage.

13. The system claimed in claim 12, said receiver comprising a servo mechanism, said monostable multivibrator being coupled to said servo mechanism to have the recovery time of said monostable multivibrator controlled by said servo mechanism in accordance with the control of said sweep frequency.

14. The system claimed in claim 1, said circuit comprising a bistable multivibrator and a monostable multivibrator connected as a resetting circuit to said bistable multivibrator, said bistable multivibrator having a gating and disabling voltage output and being connected to apply its said output to gate and disable said receiver.

15. The system claimed in claim 14, said receiver comprising a servo mechanism, said servo mechanism being coupled to said monostable multivibrator to control its recovery time from its unstable to stable conditions.

16. A distance measuring system comprising a radio transmitter, means for cyclically frequency modulating said transmitter at a certain rate to produce a frequency modulated wave whose frequency range exceeds a lower frequency limit $f_l$ and an upper frequency limit $f_u$, means for transmitting said frequency modulated wave to a wave reflecting surface; a receiver comprising means for receiving the reflected wave, means for mixing the received wave with a portion of the modulated wave transmitted directly from the transmitter to produce a beat frequency signal, and means for indicating the distance to said reflecting surface as a function of said beat frequency; and additional means for disabling said receiver during the periods that the frequency of said modulated wave exceeds said frequency limits, said additional means comprising means for producing a pulse each time that the frequency of the modulated wave passes through said frequency limits whereby there is produced a pair of pulses as it passes through the lower frequency limit and a pair of pulses as it passes through the upper frequency limit, means for producing successive gate pulses each of which is initiated by the first pulse of one of said pairs of pulses and is terminated by the second pulse of said one pair of pulses, and means for applying said gate pulses to said receiver to disable it during the occurrence of each gate pulse.

References Cited in the file of this patent

UNITED STATES PATENTS

| | | |
|---|---|---|
| 2,236,893 | Chaffee | Apr. 1, 1941 |
| 2,256,539 | Alford | Sept. 23, 1941 |
| 2,505,692 | Staal et al. | Apr. 25, 1950 |